(12) United States Patent
Bernhoff et al.

(10) Patent No.: US 7,126,235 B2
(45) Date of Patent: Oct. 24, 2006

(54) WIND POWER ELECTRIC DEVICE AND METHOD

(75) Inventors: Hans Bernhoff, Uppsala (SE); Mats Leijon, Uppsala (SE)

(73) Assignee: Swedish Vertical Wind AB, Uppsala (SE)

( * ) Notice: Subject to any disclaimer, the term of this patent is extended or adjusted under 35 U.S.C. 154(b) by 79 days.

(21) Appl. No.: 10/501,075

(22) PCT Filed: Dec. 19, 2002

(86) PCT No.: PCT/SE02/02406

§ 371 (c)(1),
(2), (4) Date: Jul. 9, 2004

(87) PCT Pub. No.: WO03/058059

PCT Pub. Date: Jul. 17, 2003

(65) Prior Publication Data

US 2005/0151376 A1      Jul. 14, 2005

(30) Foreign Application Priority Data

Jan. 10, 2002   (SE)   .................................... 0200064

(51) Int. Cl.
*F03D 7/06*   (2006.01)
*H02K 3/40*   (2006.01)

(52) U.S. Cl. ............................ 290/44; 290/55; 416/17; 310/196; 174/DIG. 20

(58) Field of Classification Search .................. 290/44, 290/55; 416/41, 17, 111; 415/4.1, 4.2; 310/196; 174/DIG. 20
See application file for complete search history.

(56) References Cited

U.S. PATENT DOCUMENTS 3,918,839 A  *  11/1975  Blackwell et al. ........... 416/175
4,050,246 A       9/1977  Bourquardez (Continued)

FOREIGN PATENT DOCUMENTS

EP       0 802 324       10/1997

(Continued)

*Primary Examiner*—Nicholas Ponomarenko
(74) *Attorney, Agent, or Firm*—Dykema Gossett PLLC

(57) ABSTRACT

A wind-power unit has a wind turbine has an electric generator connected to the wind turbine. The stator of the generator has a winding formed of a high-voltage cable having a core of conducting material, a first layer of semi-conducting material surrounding the core, an insulating layer of solid material surrounding the first layer, and a second layer of semiconducting material surrounding th solid insulation. The wind turbine has a plurality of turbine blades running vertically and being connected to a turbine shaft. The generator is arranged at the lower end of the turbine shaft. A wind-power plant; the use of a wind-power unit; and a method of generating electric power are described.

26 Claims, 5 Drawing Sheets

U.S. PATENT DOCUMENTS

| | | | | |
|---|---|---|---|---|
| 4,130,380 A * | 12/1978 | Kaiser | | 416/197 A |
| 4,303,835 A * | 12/1981 | Bair | | 290/55 |
| 4,449,053 A * | 5/1984 | Kutcher | | 290/44 |
| 4,494,007 A * | 1/1985 | Gaston | | 290/44 |
| 4,500,257 A * | 2/1985 | Sullivan | | 415/32 |
| 4,792,700 A * | 12/1988 | Ammons | | 290/55 |
| 4,853,565 A * | 8/1989 | Elton et al. | | 310/45 |
| 4,979,871 A * | 12/1990 | Reiner | | 415/4.2 |
| 5,183,386 A * | 2/1993 | Feldman et al. | | 415/119 |
| 5,299,913 A * | 4/1994 | Heidelberg | | 416/197 A |
| 5,419,683 A * | 5/1995 | Peace | | 416/227 A |
| 6,320,273 B1 | 11/2001 | Nemec | | |
| 6,379,115 B1 * | 4/2002 | Hirai | | 416/17 |
| 6,629,815 B1 * | 10/2003 | Lusk | | 415/907 |
| 6,798,107 B1 * | 9/2004 | Leijon | | 310/196 |
| 6,936,947 B1 * | 8/2005 | Leijon et al. | | 310/196 |
| 6,972,505 B1 * | 12/2005 | Leijon et al. | | 310/196 |
| 6,979,170 B1 * | 12/2005 | Dery et al. | | 415/4.2 |

FOREIGN PATENT DOCUMENTS

| | | |
|---|---|---|
| EP | 0802324 | 10/1997 |
| WO | 97/45924 | 12/1997 |
| WO | 99/29025 | 6/1999 |
| WO | 00/74198 | 12/2000 |
| WO | 0074198 | 12/2000 |

* cited by examiner

WIND POWER ELECTRIC DEVICE AND METHOD

TECHNICAL FIELD

A first aspect of the present invention relates to a wind-power unit of the type comprising a wind turbine and an electric generator connected to the wind turbine, the stator of the generator having a winding comprising a high-voltage cable, said cable comprising a core of conducting material, a first layer of semiconducting material surrounding the core, an insulating layer of solid material surrounding the first layer, and a second layer of semiconducting material surrounding the insulating layer.

A second aspect of the invention relates to a wind-power plant comprising a plurality of wind-power units in accordance with the invention.

A third aspect of the invention relates to the use of the claimed wind-power unit for producing electric current.

A fourth aspect of the invention, finally, relates to a method of generating electric power wherein a wind turbine and an electric generator are arranged connected together and the stator of the generator is wound with high-voltage cable, said cable comprising a core of conducting material, a first layer of semiconducting material surrounding the core, an insulating layer of solid material surrounding the first layer, and a second layer of semiconducting material surrounding the insulating layer.

BACKGROUND ART

The recovery of wind energy has been known for thousands of years.

Utilizing wind power for generating electric current has also been known for a long time, in principle ever since the electric generator saw the light of day.

However wind power has encountered difficulties in successfully competing economically with other energy sources for the production of electric power. The use of wind power for this purpose has long been limited to the supply of local energy and experimental plants. Although the commercial production of electric energy based on wind power has gained ground in recent decades its total production of electric power is still very marginal.

In view of the large amount of energy potentially available from wind power and of the various drawbacks associated with the production of electric power from other types of energy sources, it is imperative to create the prerequisites for increased commercially competitive production of electric power based on wind power.

It is therefore not surprising that may different principles and designs have been proposed for wind turbines. To a great extent efforts have been directed towards designing the actual turbine in the best possible way. However, it is important to consider the whole, i.e. not only the aerodynamics of the turbine, but also the mechanical transmission of movement to the generator, the design of the generator and, most particularly, all interaction between the components in these steps of the energy conversion.

A step forward in this respect is represented by the wind-power plant described in WO99/29025. This describes a wind-power unit in which the generator is provided with a stator winding that permits high induced voltages, up to 50 kV. The generator can thus supply current to the electric supply network is without the use of intermediate transformers. This is possible thanks to the special design of the stator winding in which a conducting core is surrounded by a first layer of semiconducting material. This is surrounded by an insulating layer of solid material, which is surrounded by a second semiconducting layer of semiconducting material. This type of winding in an electric turbo-generator has previously been described in WO97/45924.

The generator described in WO99/29025 enables better total economy in a wind-power unit of otherwise conventional type, i.e. with a turbine having a horizontal shaft, the turbine being of propeller type. This eliminates the need for a transformer. Wind turbines with horizontal shafts are currently almost universal.

Besides these, wind turbines having vertical shafts have also been proposed, e.g. as described in U.S. Pat. No. 6,320,273. However, these have not yet been used commercially and remain at the design stage although a few have been realized as experimental plants.

A decisive reason for wind turbines with vertical shafts not being favoured is that the output cannot be controlled by simply turning the turbine blade. They require the generator to first be provided with overload control or for it to be dimensioned large enough to receive the high outputs. This limitation prevents the energy available in winds of high velocity from being exploited.

Added to other drawbacks such as low ratio between the peripheral speed of the turbine and the wind velocity and low power coefficient, i.e. the ratio between useful power and theoretical wind power, this has meant that turbines with vertical shafts have not hitherto been considered a realistic alternative.

However wind turbines with horizontal shafts also have a number of drawbacks. The generator must either be arranged high up in the mast, in the hub of the turbine, which makes the construction expensive, or an angle gear must be arranged in the hub which also involves expense, as well as incurring losses in efficiency. A conventional wind turbine also requires a device for turning the unit depending on the direction of the wind. With a turbine of propeller type the wind power is fully exploited only in the peripherally outer areas of the turbine and the construction is in principle two-dimensional so that the wind energy is not utilized in its depth direction.

The object of the present invention, in the light of the above, is to endeavour to utilize the advantages associated with a generator with a stator winding of the type described in WO97/45924 in a wind-power unit in such a way that the wind-power unit is simple, inexpensive and capable of generating a relatively large amount of electric energy in relation to the potential available.

DESCRIPTION OF THE INVENTION

The objective set has been achieved in accordance with the first aspect of the invention in that the wind-power unit described in the preamble to claim 1 comprises the special feature that the wind-turbine is of a type comprising a plurality of turbine blades running substantially vertically and connected to a turbine shaft running substantially vertically, and in that the generator is arranged at the lower end of the turbine shaft.

In accordance with the invention, thus, a generator with the special stator winding, known per se, is used in a type of wind turbine also known per se, its application in such a context resulting in this type of wind turbine, which for the reasons stated above has not been considered to be a practically realizable alternative, acquires the prerequisites to become competitive in relation to conventional wind-power units, thanks to the fact that some of these decisive drawbacks have thus been eliminated.

The use of the special cable winding for a turbine with vertical shaft enables these advantages to be optimally utilized. In a conventional wind-power unit with such a winding the advantages of this type of winding are exploited to a very limited extent and not from the most significant aspects in the context.

Central to the invention is thus the insight that the ability of the special cable winding to receive an extremely high induced voltage in the stator winding opens the possibility of removing the obstacle that prevented turbines with vertical shafts from being considered a serious alternative to the conventional turbines with horizontal shafts. The use of the special cable winding, thus enables a wind turbine with vertical shaft to be allowed to remain in operation even during high winds. Since the cable can be induced with high voltage the high wind power at high wind strengths does not constitute a problem. The generator can be greatly overloaded for relatively long periods without any problem in the way of heat generation arising, thanks to this possibility of increasing the voltage. By thus creating the possibility of fully exploiting the wind power in this way even at high wind strengths, a little used area for the production of electric power has been opened. The available power of the winding is substantially proportional to the third power of the wind velocity. A wind-power unit that enables full use from high winds can therefore supply a relatively large amount of energy and thus achieve a very high degree of efficiency, i.e. kWh/kr. The wind-power unit in accordance with the invention can become extremely competitive, particularly in places with frequent strong winds, e.g. mountain ranges and out to sea.

The wind-power unit in accordance with the invention eliminates the drawbacks associated with wind turbines having horizontal shafts and the drawbacks that have prevented turbines with vertical shafts from being a realistic alternative hitherto. The prerequisites are thus created for generating electric energy based on wind power in a more economical and efficient manner than has previous been possible.

The wind-power unit in accordance with the invention will have relatively few adjustable parts and few movable components, which further contributes to good total economy. This reduces the need for repairs and maintenance and the cost of investment can therefore be lower than for conventional wind-power units. Another consequence is that the technical service life can be greatly extended past the 15 years normal for wind-power units. This, together with the high efficiency, contributes to the wind-power unit claimed creating entirely new prospects for the production of electric energy through wind power.

In accordance with a preferred embodiment of the claimed wind-power unit the generator is arranged to be able to be in operation for a long period of time with an output several times greater than the rated output, preferably 3–5 times the rated output.

By thus exploiting the ability of this type of winding to operate with high voltage and by otherwise dimensioning the generator accordingly, heat development at such overloading will not constitute any limitation. This embodiment makes use of this possibility so that the wind turbine can give an output that would otherwise require a considerably larger conventional generator. An output in the order of 5 MW can easily be achieved.

In accordance with another preferred embodiment the winding is arranged for a field strength exceeding 10 kV/mm.

This contributes further to enabling the generator to be supplied with high power for the wind turbine.

In yet another preferred embodiment the wind turbine is mechanically dimensioned for operation in wind strengths above 13 m/s with the same turbine-blade setting as at lower wind strengths.

Since the generator can without problem be supplied with power from wind strengths of this level, it is expedient to also dimension the wind turbine for this. The advantages of the claimed wind-power unit are thus exploited to the fullest extent.

In accordance with yet another preferred embodiment the wind turbine is mechanically dimensioned for operation in wind strengths in excess of 25 m/s.

This is a level at which conventional wind-power units must generally be closed down completely. Although the cost of the wind turbine naturally increases when it is dimensioned in this way, it may still be justifiable in some cases since the generator in accordance with the invention is easily capable of managing this.

This applies particularly to wind-power units placed where high winds often occur.

In accordance with still another preferred embodiment the rotor of the generator is provided with permanent magnets.

This is an embodiment that is favourable in the present context, both from the cost and the operating reliability aspects.

In accordance with another preferred embodiment the generator comprises a self-starting winding.

A drawback with conventional wind turbines having vertical shafts is that they are not self-starting. This drawback is simply and conveniently eliminated by arranging a self-starting winding.

In accordance with another preferred embodiment the main winding of the generator is arranged to permit starting of the unit.

This alternative for starting exploits the advantages of the special winding and facilitates its use in motor function.

In accordance with a preferred embodiment of the claimed wind-power unit the rotor shaft of the generator is also substantially vertical and concentric with the turbine shaft. This eliminates the need for an angle gear and the losses this would entail.

In accordance with a preferred embodiment the unit comprises a base arranged under the generator, on which base the generator rotor is journalled.

This embodiment provides stable support for the rotor and creates favourable journalling with slight losses.

In accordance with still another embodiment the axial bearing is dimensioned to carry the weight of both the generator rotor and the wind turbine.

This allows the mast or stand for the wind turbine to be slimmer and therefore less expensive. Alternatively it can be entirely omitted.

In accordance with yet another preferred embodiment the weight of the wind turbine is carried primarily by the turbine shaft, said shaft thus also functioning as a mast for the unit.

By thus eliminating the need for a mast or other extra supporting construction besides the shaft itself, the number of components necessary to construct the unit is reduced. In many cases such a unit is simpler, cheaper and requires less maintenance.

In accordance with a further preferred embodiment, the upper part of the turbine shaft is journalled in at least one radial bearing that is secured laterally by inclined stays and/or bracing cables.

Such an embodiment offers a simple way of achieving radial journalling for the upper part of the turbine shaft. This construction is particularly advantageous if, as described above, the turbine shaft is also to constitute the mast for the unit. A unit designed in this way is extremely simple in its construction.

In accordance with an additional preferred embodiment the turbine shaft is jointed at its lower part.

The turbine being provided with a joint in this way means that when the unit tends to bend in high winds, the bending force will not be transmitted to the lower part of the turbine shaft. Its radial journal can thus be made relatively slim, thereby saving costs.

Another embodiment shows the turbine blades to have an asymmetrical profile in a horizontal cross section.

An asymmetrical profile enables the force of the wind on the blades to be optimized, therefore obtaining a high power coefficient.

In accordance with another preferred embodiment the profile of the turbine blades can be adjusted during operation.

Since, when it rotates, each turbine blade will have a different angle in relation to the wind direction, the optimal profile of the blade is different in different positions during the revolution. Adjustability enables this relationship to be adapted so that the turning power of the wind on the turbine will be as great as possible. Adjustment to different wind strengths can also be optimized in this way.

The preferred embodiments of the wind-power unit in accordance with the invention, described above, are defined in the subordinate claims to claim 1.

The claimed wind-power unit is well suited for combining with several similar units to form a wind-power plant. The second aspect of the invention thus relates to a wind-power plant wherein the stator winding of each wind-power unit is connected via a circuit breaker and a rectifier to an inverter that is common to a plurality of wind-power units, said inverter being arranged to supply energy to an electric supply network.

The wind-power plant described enables a practically realizable solution for a system to produce electric energy on a larger scale using units of the type described, and thus exploit the advantages offered.

In a third aspect of the invention the objective set is achieved by the use of the claimed wind-power unit or the wind-power plant for generating electric power, thereby gaining advantages of the type indicated above.

The objective set is achieved in a fourth aspect of the invention in that a method of the kind described in the preamble to claim 25 comprises the special measures of providing the wind turbine with a plurality of turbine blades running substantially vertically and connected to a turbine shaft oriented substantially vertically, and in that the generator is arranged at the lower end of the turbine shaft.

In accordance with preferred embodiments the claimed method is utilized while making use of the wind-power unit and the preferred embodiments thereof.

Advantages are thus gained equivalent to those described above for the wind-power unit and its preferred embodiments.

The term "substantially vertically oriented turbine blades" is intended in this patent application to mean that the main extension of each turbine blade is in vertical direction all the time. The extension of the blade from its ends may either be substantially rectilinear or may follow a curved line. Thus both wind turbines with so-called Darrieus rotor and with so-called H-rotor are included.

The invention is described in more detail in the following detailed description of advantageous examples thereof, with reference to the accompanying drawings.

DESCRIPTION OF ADVANTAGEOUS EMBODIMENTS

Figure 1:
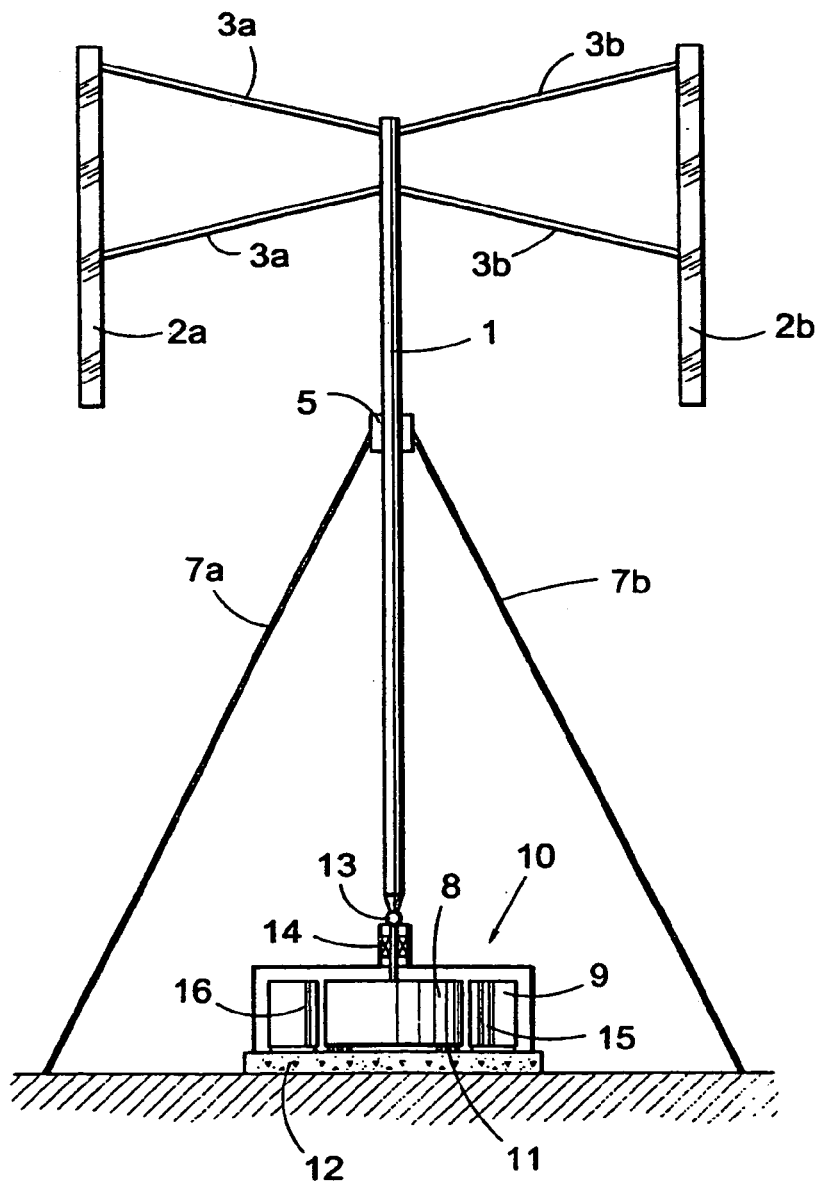
FIG. 1 is a schematic view from the side of a wind-power unit in accordance with the invention.

The wind turbine illustrated in FIG. 1 is an H-rotor. It has a vertical turbine shaft 1 and a number of vertical, substantially rectilinear turbine blades 2a, 2b. In the example shown the turbine has two blades but it may have three or more blades. Each blade 2a, 2b is rigidly connected to the turbine shaft 1 by means of stays.

The upper part of the turbine shaft is journalled in a radial bearing 5 supported by bracing cables 7a, 7b. The number of stays should be at least three. The stays may be bracing cables or rigid stays.

The lower end of the turbine shaft 1 is non-pivotably joined with the rotor 8 of an electric generator 10 and thus also constitutes the rotor shaft. The rotor 8 is axially journalled in a supporting bearing 11 on a base 12 arranged on the ground or on a sea bed. The supporting bearing 11 is dimensioned to be able to support both the weight of the rotor 8 and that of the wind turbine.

In the example shown in FIG. 1, therefore, the turbine shaft itself supports the wind turbine. Alternatively the shaft may be enclosed in a mast or other type of stand that carries the weight of the turbine. The turbine shaft can then be dimensioned only for the transmission of the torque and may therefore be weaker.

The stator 9 of the generator 10 is provided with a winding 15 of high-voltage cable, only a couple of winding turns being indicated in the figure. The cable is described in more detail with reference to FIG. 2.

The turbine shaft 1 is provided at its lower end with a joint 13 of universal type. The part located below the joint, which constitutes the rotor shaft, is weaker and journalled in a radial bearing 14. The joint 13 prevents bending of the turbine shaft 1 as a result of high winds, from causing stress in the radial bearing 14.

The generator 10 is provided with a starting winding 16 to self-start the unit. A separate motor may alternatively be used for this, or the main winding 15 of the generator may be used to start the turbine.

Figure 2:
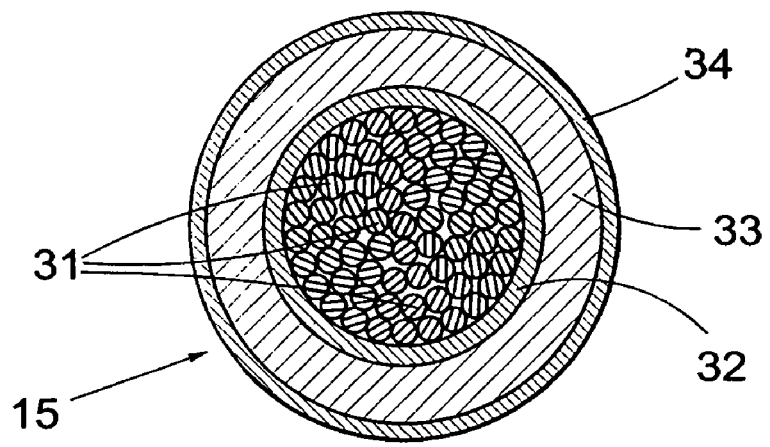
FIG. 2 is a cross section through a cable in the stator winding in accordance with the invention.

The winding of the generator comprises a high-voltage cable 15. FIG. 2 shows a cross section through the cable. It consists of a core with one or more strand parts 31 of an electric conductor, e.g. copper. The core is surrounded by an inner semiconducting layer 32. Outside this is a layer of solid insulation 33, e.g. XLPE insulation. Around the insulation is an outer semiconducting layer 34. Each of the semiconducting layers forms an equipotential surface. For a further understanding of a generator provided with this type of winding, please refer to WO97/45924 mentioned in the introduction.

Figure 3:
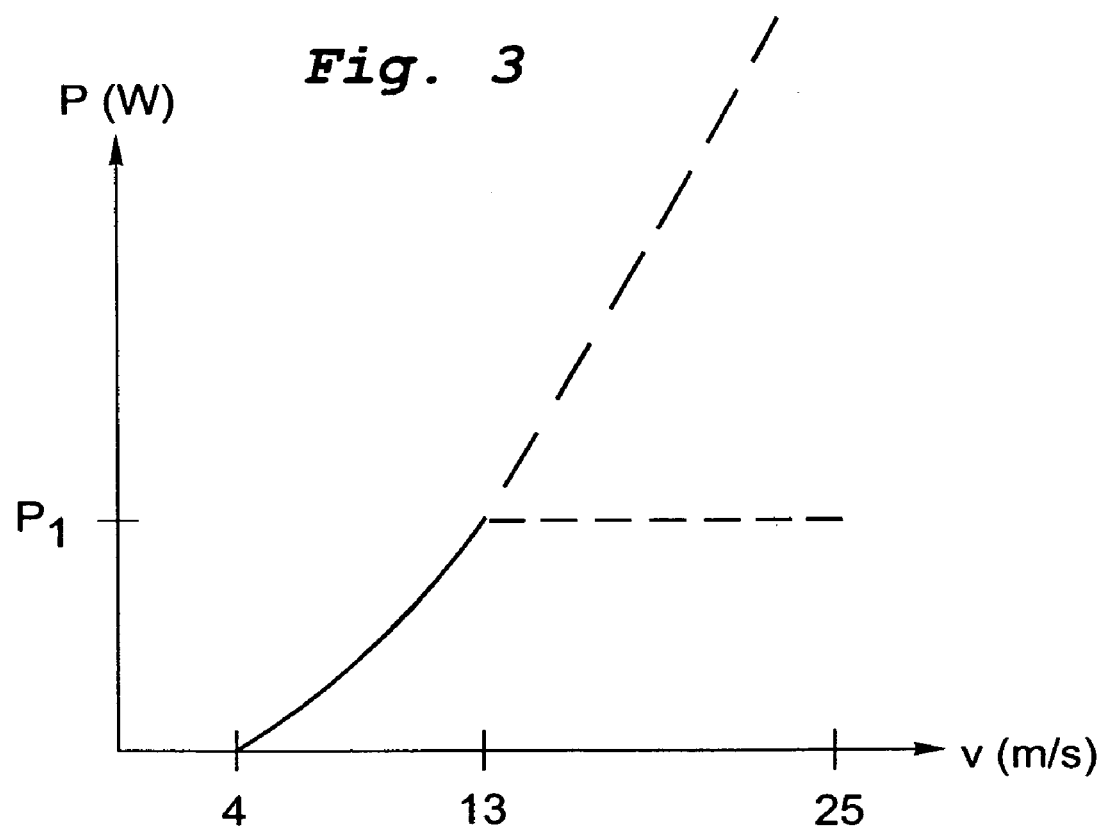
FIG. 3 is a diagram illustrating possible output from a wind-power unit in accordance with the invention.

FIG. 3 illustrates schematically how the output P available from the wind varies with the wind velocity v. The output is substantially to the third power of the wind velocity. For velocities below 4 m/s the output is normally so little that it is of no interest for generating electricity. However, for wind strengths above 13 m/s the output is so great that a wind-power plant provided with conventional generator would be overloaded. The power-extraction must therefore be limited at higher velocities to the output P1 which is equivalent to 13 m/s. It is difficult to achieve the output limitation in a reasonable way for a wind turbine with vertical shaft and such a turbine cannot therefore be used at high wind strengths. As mentioned above, this is one of the reasons that such turbines have not been used.

There is no such limitation with the wind-power unit in accordance with the invention, where the stator is wound with high-voltage cable. The power-extraction can therefore be performed in accordance with the broken-line curve since the cable can withstand being subjected to extremely high voltages and since it can be overloaded for an extended period of time. The upper region is thus accessible for use. Particularly in regions where the winds are frequently strong, therefore, a wind-power unit in accordance with the invention can generate considerably more electric power than a conventional unit.

The higher the wind velocity, the greater the speed of the turbine. The resultant increased output results in only the voltage increasing in the winding in accordance with the equation $$U = -n \cdot \frac{d\varnothing}{dt}$$

where n is the speed and $$\frac{d\phi}{dt}$$

is the induction dependent on the rotation.

Figure 4:
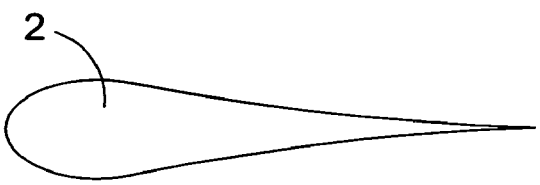
FIG. 4 is a cross section through a turbine blade in a wind-power unit in accordance with a first embodiment of the invention.

FIG. 4 illustrates in cross section the profile of a turbine blade 2 in an example of a wind turbine in accordance with the invention. In this embodiment the profile is symmetrical and solid.

Figure 5:
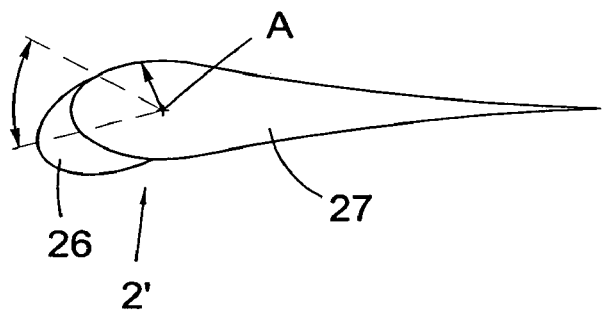
FIG. 5 is a cross section through a turbine blade in a wind-power unit in accordance with a second embodiment of the invention.

FIG. 5 illustrates in cross section the profile of a turbine blade 2' in an alternative example of a wind turbine in accordance with the invention. In this case the profile is asymmetrical. The blade 2' has a nose section 26 that is movable in relation to a stationary part 27 of the blade 2'. The stationary part 27 has a forward convex cylinder profile and the nose section 26 has a corresponding concave cylinder profile at its rear end whereby it is journalled on the cylinder profile of the stationary part 27. The nose section 26 can be turned in the plane of the paper about the point A. The asymmetrical profile of the blade can be set by different angular positions of the nose section 26 in relation to the stationary part 27. Adjustment is performed during operation by means of a mechanism (not shown), via the horizontal stay 3. The position of the nose section 26 can thus be continuously adjusted to the optimum at each point as the blade rotates around the turbine shaft.

Figure 6:
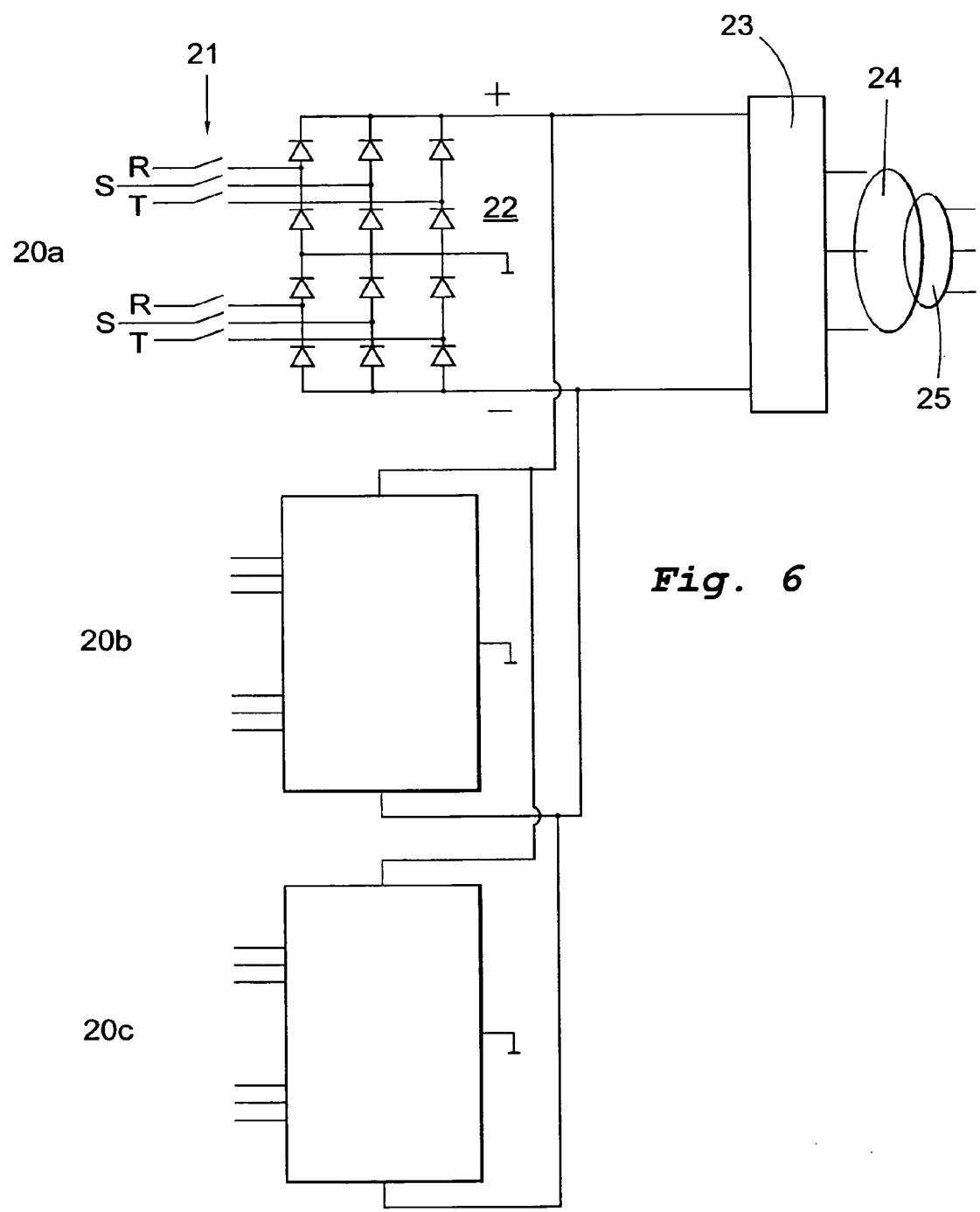
FIG. 6 is a diagram illustrating how several units are combined to form a wind-power plant.

A wind-power plant in accordance with the invention consists of two or more units of the type described above. FIG. 6 illustrates how these are connected together to supply current to an electric supply network. In the example shown the power plant consists of three units, symbolically designated 20a–20c. Each unit is connected via a breaker or contactor 21 and a rectifier 22 to an inverter 23 in a bipolar connection according to the figure. The circuit diagram is only drawn in for the unit 20a. It will be understood that the other units 20b, 20c are connected in corresponding manner. The inverter 23 supplies three-phase current to the electric supply network 25, possibly via a transformer 24 and/or a filter. The rectifiers may be diodes, which may be controlled and of type IGBT, GTO or thyristors, comprise controlled bipolar components or they may not be controlled. The voltages on the DC side may be connected in parallel or in series, or a combination of both.

Figure 10:
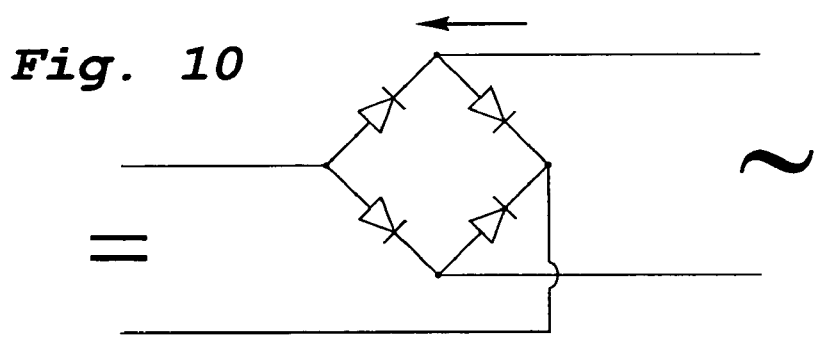
FIG. 10 shows an alternative example of rectification.

Alternatively a full-wave rectifier of the type illustrated in FIG. 10 may be used.

Figure 7:
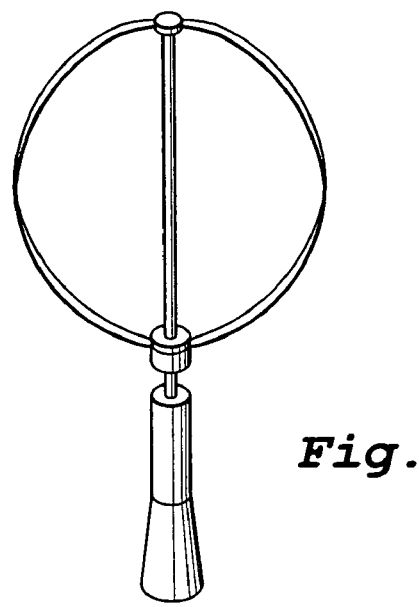
FIG. 7 illustrates in perspective a second embodiment of the wind-power unit in accordance with the invention.

The type of turbine illustrated in FIG. 1 has a so-called H-rotor. Another type of wind turbine with vertical shaft and vertically running blades is the so-called Darrieus rotor. This is illustrated in FIG. 7. The major difference is that the vertical blades are curved in arc-form and the ends of each blade are secured to the turbine shaft. In this type also similar advantages are obtained by the use of a generator with high-voltage winding.

Figure 8:
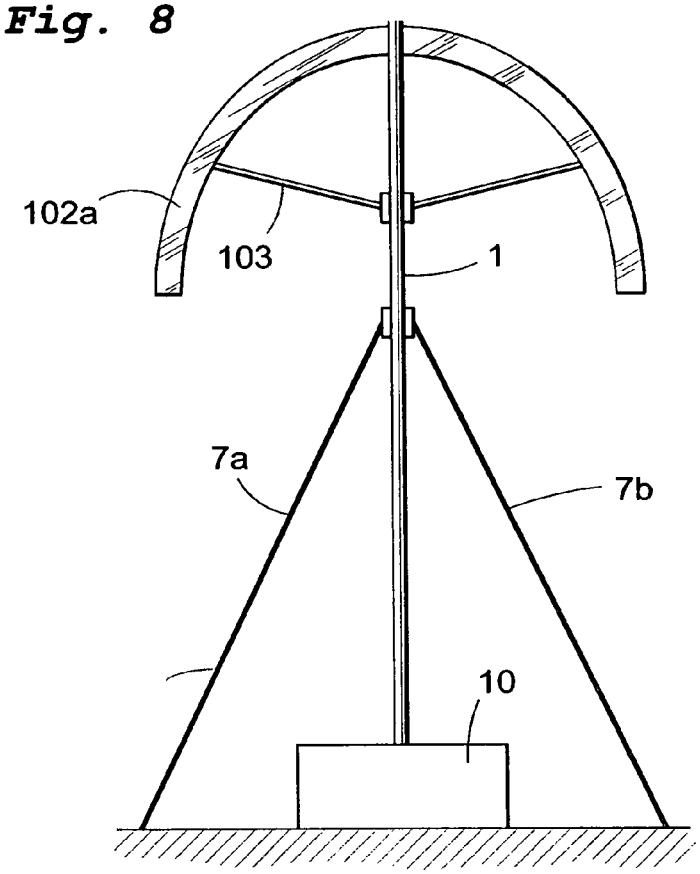
FIG. 8 illustrates a view from the side of a third embodiment of a wind-power unit in accordance with the invention.

FIG. 8 illustrates yet another alternative embodiment of a wind turbine in accordance with the invention. In this case each turbine blade 102a, 102b is secured to the upper end of the turbine shaft 1 and runs down, following a curvature that may be circular, parabolic or similar. The lower part of each blade is connected to the shaft 1 by means of stays 103. This type of wind turbine may be thought of as a hybrid between H-rotor and Darrieus rotor and has the advantage over them that space is provided for bracing with stays 7a, 7b.

Figure 9:
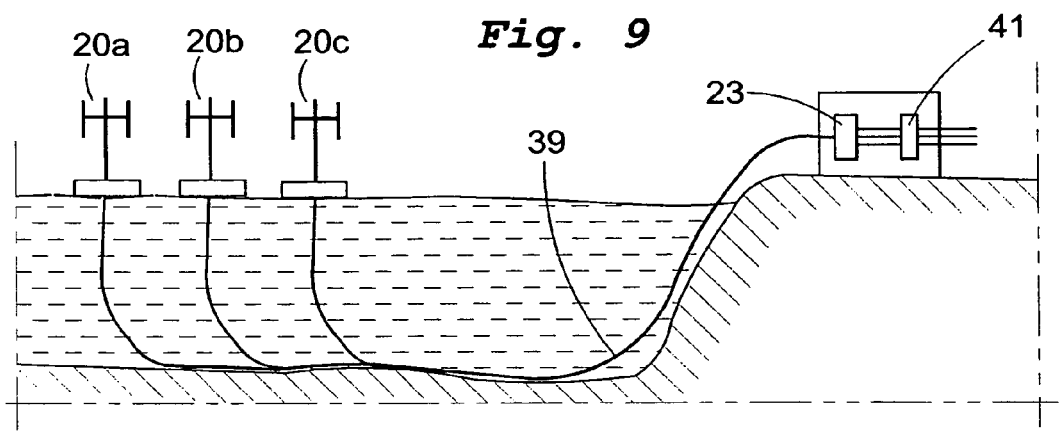
FIG. 9 illustrates a wind-power plant in accordance with the invention located at sea.

FIG. 9 illustrates schematically a wind-power plant placed out at sea. It has a number of wind-power units 20a, 20b, 20c connected together. A rectifier is arranged at the generator of each unit and the DC current is conducted via cables arranged on the sea bed, to a station on land having an inverter 23 and a filter 41 from whence electric power is supplied to a distribution or transmission network.

The invention claimed is:

1. A wind-power unit comprising a wind turbine and an electric generator connected to the wind turbine, the stator of the generator having a winding comprising a high-voltage cable, said cable comprising a core of conducting material, a first layer of semiconducting material surrounding the core, an insulating layer of solid material surrounding the first layer, and a second layer of semiconducting material surrounding the insulating layer, wherein the wind turbine includes a plurality of turbine blades running substantially vertically and connected to a turbine shaft running substantially vertically, and in that the generator is arranged at the lower end of the turbine shaft.

2. A wind-power unit as claimed in claim 1, wherein the generator is arranged to be able to be in operation for a long period of time with an output several times greater than the rated output, preferably 3–5 times the rated output.

3. A wind-power unit as claimed in claim 1, wherein the winding is arranged for a field strength exceeding 10 kV/mm.

4. A wind-power unit as claimed in claim 1, wherein the wind turbine is mechanically dimensioned for operation in wind strengths above 13 m/s with the same turbine-blade setting as at lower wind strengths.

5. A wind-power unit as claimed in claim 4, wherein the wind turbine is mechanically dimensioned for operation in wind strengths in excess of 25 m/s.

6. A wind-power unit as claimed in claim 1, wherein the rotor of the generator is provided with permanent magnets.

7. A wind-power unit as claimed in claim 1, wherein the rotor shaft of the generator is substantially vertical and concentric with the turbine shaft.

8. A wind-power unit as claimed in claim 7, wherein the unit comprises a base arranged under the generator, on which base the generator rotor is journalled in an axial bearing.

9. A wind-power unit as claimed in claim 8, wherein the axial bearing is dimensioned to carry both the weight of the generator rotor and that of the wind turbine.

10. A wind-power unit as claimed in claim 1, wherein the weight of the wind turbine is carried primarily by the turbine shaft, said shaft thus also functioning as a mast for the unit.

11. A wind-power unit as claimed in claim 1, wherein the upper part of the turbine shaft is journalled in at least one radial bearing that is secured laterally by inclined stays and/or bracing cables.

12. A wind-power unit as claimed in claim 1, wherein the turbine shaft is jointed at its lower part.

13. A wind-power unit as claimed in claim 1, wherein the turbine blades are substantially rectilinear.

14. A wind-power unit as claimed in claim 1, wherein both ends of each turbine blade are situated close to the turbine shaft and the blades run in a curved shape between their ends.

15. A wind-power unit as claimed in claim 1, wherein the upper end of each turbine blade is situated close to the upper end of the turbine shaft and its lower end is situated a relatively large distance from the turbine shaft, said distance being preferably within the interval 0.1–0.5 times the length of the turbine shaft, and in that each turbine blade runs in a curve from its upper to its lower end.

16. A wind-power unit as claimed in claim 1, wherein the turbine blades have asymmetrical profile in a cross section.

17. A wind-power unit as claimed in claim 1, wherein the profile of the turbine blades in a cross section is regular during operation.

18. A wind-power unit as claimed in, claim 1, wherein it is designed for placement at sea.

19. A wind-power unit as claimed in claim 1, wherein it is designed for placement on mountain ranges.

20. A wind-power plant as claimed in claim 1, wherein the stator winding of each wind-power unit is connected by a rectifier to an inverter that is common to a plurality of wind-power units, said inverter being arranged to supply energy to an electric supply network.

21. A wind-power plant as claimed in claim 20, wherein its unit is designed for placement at sea, and each inverter is arranged in connection with each unit and in that the inverter is arranged on land.

22. A wind-power plant as claimed in claim 21, wherein each wind-power unit is connected to the inverter via a cable arranged on or close to the sea/lake bed.

23. A method of generating electric power wherein a wind turbine and an electric generator are arranged connected together and the stator of the generator is wound with high-voltage cable, said cable comprising a core of conducting material, a first layer of semiconducting material surrounding the core, an insulating layer of solid material surrounding the first layer, and a second layer of semiconducting material surrounding the insulating layer, wherein the wind turbine is provided with a plurality of turbine blades running substantially vertically and connected to a turbine shaft oriented substantially vertically, and in that the generator is arranged at the lower end of the turbine shaft.

24. A method as claimed in claim 23, wherein the method is utilized when using a wind-power unit.

25. A method as claimed in claim 23, wherein the wind turbine is kept in active operation at wind strengths in excess of 13 m/s without altering the turbine blades and without the wind turbine being retarded.

26. A method as claimed in claim 25, wherein the wind turbine is kept in active operation at wind strengths in excess of 25 m/s.

* * * * *